United States Patent
Olofsson

(10) Patent No.: US 10,521,574 B2
(45) Date of Patent: Dec. 31, 2019

(54) PORTABLE ELECTRONIC DEVICE

(71) Applicant: Fingerprint Cards AB, Göteborg (SE)

(72) Inventor: Olis Olofsson, Malmö (SE)

(73) Assignee: FINGERPRINT CARDS AB, Gothenburg (SE)

(*) Notice: Subject to any disclaimer, the term of this patent is extended or adjusted under 35 U.S.C. 154(b) by 231 days.

(21) Appl. No.: 15/407,554

(22) Filed: Jan. 17, 2017

(65) Prior Publication Data

US 2017/0242992 A1     Aug. 24, 2017

(30) Foreign Application Priority Data

Feb. 18, 2016   (SE) .................................... 1650212

(51) Int. Cl.
| | |
|---|---|
| *G06F 21/32* | (2013.01) |
| *G06F 3/01* | (2006.01) |
| *G06F 21/31* | (2013.01) |
| *G06F 3/0346* | (2013.01) |

(52) U.S. Cl.
CPC .............. *G06F 21/32* (2013.01); *G06F 3/017* (2013.01); *G06F 3/0346* (2013.01); *G06F 21/316* (2013.01)

(58) Field of Classification Search
CPC ..................................................... G06F 21/32
USPC ............................................................. 726/18
See application file for complete search history.

(56) References Cited

U.S. PATENT DOCUMENTS

| | | | |
|---|---|---|---|
| 8,593,576 B2 | 11/2013 | Friedman | |
| 9,141,150 B1* | 9/2015 | Trundle | ............... G06F 1/1694 |
| 2013/0214902 A1* | 8/2013 | Pineau | .................... H04W 4/90 |
| | | | 340/5.61 |
| 2013/0257758 A1* | 10/2013 | Huang | ................... G06F 3/041 |
| | | | 345/173 |
| 2014/0075385 A1 | 3/2014 | Wan et al. | |
| 2014/0302818 A1* | 10/2014 | Fyke | ....................... G06F 21/32 |
| | | | 455/411 |
| 2017/0046508 A1* | 2/2017 | Shin | .................... G06K 9/00892 |

FOREIGN PATENT DOCUMENTS

WO         2013055953 A1       4/2013

* cited by examiner

*Primary Examiner* — Jacob Lipman
(74) *Attorney, Agent, or Firm* — RMCK Law Group, PLC

(57) ABSTRACT

The present invention relates to a portable electronic device and corresponding method allowing control of a remotely positioned electronic arrangement, allowing for improved user convenience and security improvements when combining gesture identification with fingerprint authentication.

16 Claims, 5 Drawing Sheets

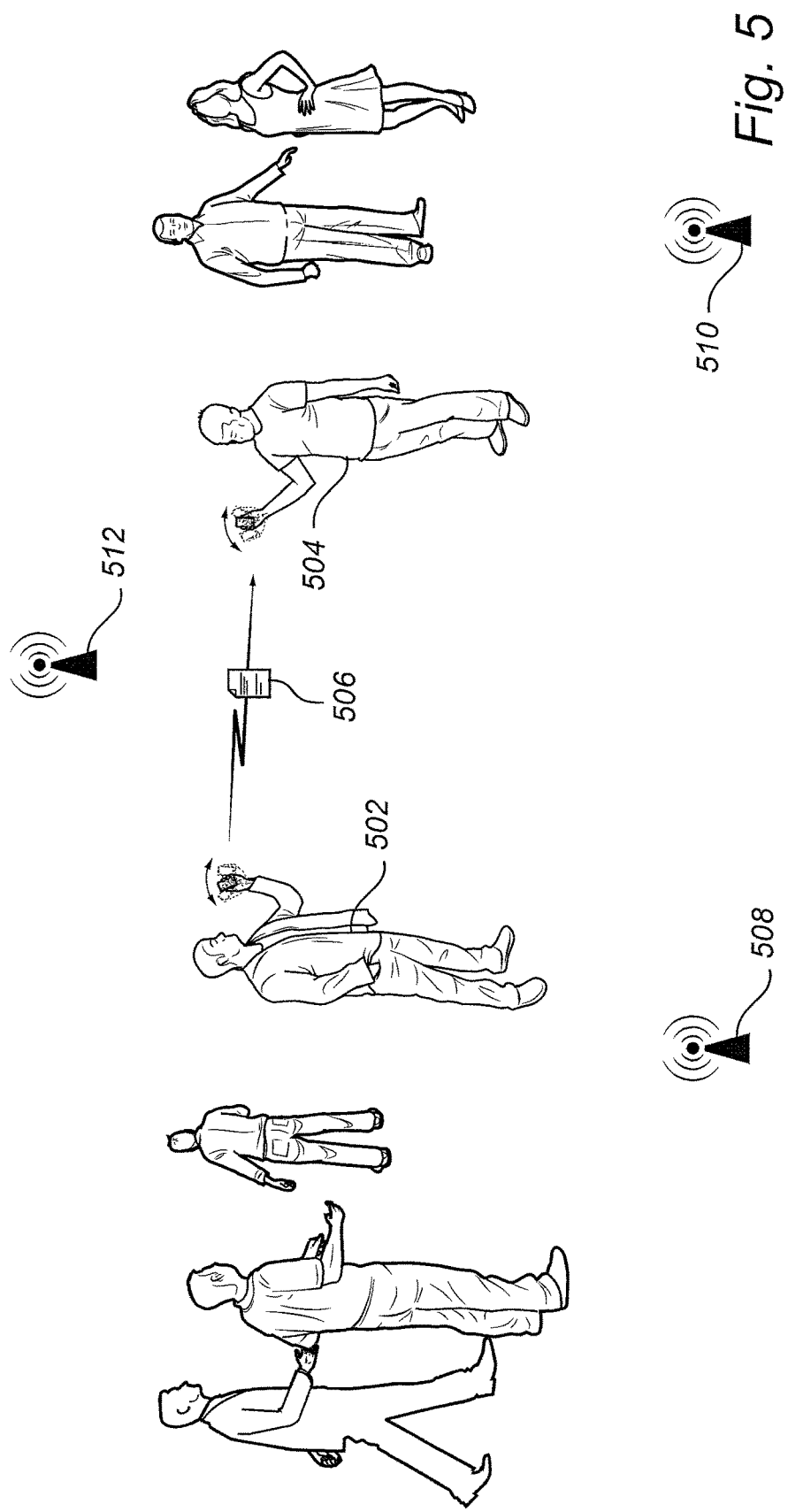

PORTABLE ELECTRONIC DEVICE

CROSS-REFERENCE TO RELATED APPLICATION

The present application is based on and claims the benefit of Swedish patent application Serial No. 1650212-2, filed Feb. 18, 2016, the content of which is hereby incorporated by reference in its entirety.

TECHNICAL FIELD

The present invention relates to a portable electronic device and corresponding method allowing control of a remotely positioned electronic arrangement, allowing for improved user convenience and security improvements when combining gesture identification with fingerprint authentication.

BACKGROUND OF THE INVENTION

Portable electronic devices, such as smartphones, watches and tablets, are incorporating more and more sensors and communication interfaces, which provide for much functionality that is not available to desktop computers. For example, motion sensors, such as inertial sensors like accelerometers or gyroscopes, can be included with the portable electronic device. Accelerometers can be used for measuring linear acceleration and gyroscopes can be used for measuring angular velocity of a moved device. A smartphone may for example use accelerometers to detect the tilt of the device in space, which allows a video picture to be displayed in an orientation corresponding to the tilt.

U.S. Pat. No. 8,593,576 provides an example of how data from an accelerometer comprised with an electronic device may be used. Specifically, U.S. Pat. No. 8,593,576 discloses how the accelerometer data is used for determining a gesture command, the gesture command in turn used for wirelessly operating a remote-controlled device. However, even though U.S. Pat. No. 8,593,576 shows an interesting approach to control of remotely arranged equipment, the presented solution has a low level of security, easily to be misused by an incorrect user.

SUMMARY OF THE INVENTION

In view of the above-mentioned security problems, it is an object of the present invention to provide an improved portable electronic device where the remotely arranged equipment is guaranteed to be controlled by a correct and thoroughly authenticated user.

According to an aspect of the present invention, it is therefore provided a portable electronic device, comprising a fingerprint sensor providing fingerprint data representing a finger of a user arranged at the fingerprint sensor, a transmitter configured to allow wireless communication with a remotely positioned electronic arrangement, at least one motion sensor providing sensed data based on movement of the portable electronic device in space, and processing circuitry connected to the fingerprint sensor, the transmitter and the at least one motion sensor, wherein the processing circuitry is configured to acquire the fingerprint data from the fingerprint sensor, authenticate the user of the portable electronic device based on the fingerprint data and an enrolled fingerprint of the finger of the user, acquire sensed data from the at least one motion sensor, identify a gesture made by the user moving the electronic portable device based on the sensed data from the at least one motion sensor, the gesture representing a functional command, and—transmit, using the transmitter, the functional command together with an identity of the authenticated user to the remotely positioned electronic arrangement, wherein the user is authenticated in parallel with identifying the gesture.

Users of portable electronic devices, such as a smartphone (mobile phone) tend to have the device readily available in all situations. For example the inclusion of near field communication (NFC) transceivers with smartphones have shown to be successful for interacting with further electronic arrangements arranged at away at a very short distance, the user simply has to touch an NFC reader with his smartphone to perform a specific function, such as unlocking a door or performing a payment action. The very close proximity allows for a high security, thus keeping any third parties distantly away from the communication between the smartphone and the further electronic arrangement.

However, in some situations it would be highly desirable to be able to also control/interact with more remotely positioned electronic arrangements, possibly without of physical reach but typically within a visible viewing distance. The typical approach would be to install an application ("App") with the smartphone, enter identification data for a user within the app and use a graphical user interface (GUI) provided with the app for interacting with the remotely positioned electronic arrangements. To achieve a high level of usability of such a GUI, the user of the smartphone must be instructed in how to control the GUI to perform the intended control/interaction.

The present invention provides a solution that simplifies this control/interaction even further, by identifying gestures made by the user when moving the portable electronic device, where the gesture in itself serves as a functional command used in the control/interaction with the remotely positioned electronic arrangement. However, to keep an in comparison high security level it has identified to be insufficient to only rely on previously entered identification data for the user (e.g. through the GUI) as such information possibly could be unintentionally accessed by a third party. In fact, to achieve a high level of security and for simplifying the identification process further, the inventor has shown that it is desirable to only allow gesture identification when the user at the same time is guaranteed to be identified using the fingerprint sensor. That is, the user is authenticated in parallel with identifying the gesture.

In some implementations this may take the form of only acquiring sensed data from the at least one motion sensor when the fingerprint data simultaneously is acquired from the fingerprint sensor. However, the acquisition processes (for fingerprint data and motion sensor data) must in accordance to the invention not necessarily in all embodiments take place absolutely simultaneously, rather in some embodiments the user is first authenticated based on the fingerprint data and then the gesture is identified, with the requirement that the user is guaranteed to not release his finger from the fingerprint sensor from when the fingerprint data has finally been acquired until when the gesture finally has been identified. Accordingly, the user typically contacts the fingerprint sensor and keeps his finger at the fingerprint sensor for the duration of authenticating the user and for identifying the gesture. Thus, the user only removes his finger from the fingerprint sensor once the gesture has been identified (or at least when the motion sensor data has been acquired).

This requirement may in some implementations be extended further by only allowing the functional command to be transmitted to the remotely positioned electronic arrangement if the user's finger is arranged at the fingerprint sensor for a complete duration of acquiring sensed data from the at least one motion sensor and identifying the gesture made by the user moving the electronic portable device. Thus, the user identity of the user is "guaranteed" for the full duration from when the finger is first placed in contact with the fingerprint sensor until the functional command has been transmitted to the positioned electronic arrangement.

It should be understood that the fingerprint sensor preferably is a fingerprint touch sensor; however the invention may also be implemented using e.g. a swipe fingerprint sensor. The fingerprint sensor may be implemented using any kind of current or future fingerprint sensing principle, including for example capacitive, ultrasonic, optical, or thermal sensing technology, or a combination thereof. However, at present capacitive sensing is most preferred. Both one and two-dimensional sensors are possible and within the scope of the invention.

Within the context of the present disclosure, the expression "fingerprint data" should be interpreted broadly and to include both a regular "visual image" of a fingerprint of a finger as well as a set of measurements relating to the finger when acquired using the fingerprint sensor. A plurality of fingerprint images may be subsequently acquired and fused together, where the resulting information is used as an input for determining sets of fingerprint features.

The requirement that the finger should be in contact with the fingerprint sensor for the full duration of the mentioned processes may for example be handled by a (semi) continuous acquisition (and processing) of fingerprint data from the fingerprint sensor. Alternatively further hardware (e.g. a pair of electrodes connected to the processing circuitry) may be included in the vicinity of the fingerprint sensor for achieving the same result.

In an embodiment of the invention the at least one motion sensor comprises an accelerometer, typically mechanically integrated with the portable electronic device. However, any type of motion sensors configured to detect linear translations, rotational translations, linear acceleration, rotational acceleration, or a combination thereof, may be used within the context of the invention. For example, the at least one motion sensor may alternatively, or also, include microelectromechanical systems (MEMS) or MEMS components, such as gyroscopes, a set of sensors capable of detecting a motion along three gyroscope axes, or any other types of related motion sensors. Accordingly, the at least one motion sensor may typically be configured to determine a spatial acceleration involving multiple axes of motion simultaneously.

Preferably, the portable electronic device is further configured to identify a plurality of different gestures performed by the user moving the portable electronic device, where each of the plurality of different gestures are arranged to represent a corresponding different functional command to be transmitted to the remotely positioned electronic arrangement. Accordingly, the processing circuitry is preferably further configured to store data relating to a plurality of previously enrolled gestures performed by the user, and match the sensed data from the at least one motion sensor with the plurality of previously enrolled gestures to identify a current gesture made by the user moving the electronic portable device. Thus, it is preferred to configure the portable electronic device to allow the user to enroll the different gestured by instructing the user to move the portable electronic device according to a plurality of different movement patterns, and allow the different movement patterns to be assigned with specific functional commands. The different movement patterns may for example include twisting the portable electronic device and rotating the portable electronic device. As referred to herein, rotation of the portable electronic device can include pitch, roll, and yaw about various rotational axes, e.g. along linear axes x, y and z.

In an embodiment of the invention the identity of the authenticated user is "tagged" with the functional command. That is, once a (e.g. secure) line of wireless communication has been established between the portable electronic device and the remotely positioned electronic arrangement, and the gesture has been identified, the corresponding functional command is together with the identity of the user transmitted from the portable device to the remotely positioned electronic arrangement. Accordingly, the functional command is preferably used for performing some form of function at the remotely positioned electronic arrangement. In some embodiments e.g. a physical feature may be adjusted at the remotely positioned electronic arrangement, such as controlling an illumination level (of e.g. at least one luminaire) or for unlocking a door controlled by the remotely positioned electronic arrangement. Other, non-physical features may also be controlled at the remotely positioned electronic arrangement, such as for example allowing the remotely positioned electronic arrangement to receive some form of data file, such as an image, electronic business card information, etc. In some embodiments the remotely positioned electronic arrangement may thus be a portable electronic device as discussed above.

As mentioned above, the invention is typically targeting the situation where the portable electronic device and the remotely positioned electronic arrangement are arranged within a "visible" distance from each other, such as for example less than 100 meters from each other. Correspondingly, the portable electronic device and the remotely positioned electronic arrangement are typically arranged more than 10 cm from each other, i.e. at a further distance than what is possible when using e.g. NFC technology.

In a possible embodiment of the invention the portable electronic device is configured to determine a spatial relation between the portable electronic device and the remotely positioned electronic arrangement. Accordingly, the portable electronic device may for example be provided with a wireless receiver configured to receive data from e.g. a "beacon", such as a Bluetooth beacon as will be further elaborated below. By means of this further feature of the portable electronic device, it may for example be possible to functional commands to only be transmitted in specified directions, taking into account the spatial positioning of the portable electronic device and the remotely positioned electronic arrangement in relation to the at least one beacon, thereby allowing the implementation of location based service (LBS).

Furthermore, the portable electronic device may in some embodiments be provided as a component of an electronic control system, further comprising at least one of the above discussed remotely positioned electronic arrangements, and possibly a beacon.

The expression "processing circuitry" as used above should be understood to include any type of computing device, such as an ASIC, a micro-processor, etc. It should also be understood that the actual implementation of such a processing circuitry may be divided between more than a single device/circuit.

According to another aspect of the present invention, there is provided a method to control a remotely positioned electronic arrangement using a portable electronic device, the portable electronic device comprising a fingerprint sensor providing fingerprint data representing a finger of a user arranged at the fingerprint sensor, a transmitter configured to allow wireless communication with a remotely positioned electronic arrangement, at least one motion sensor providing sensed data based on movement of the portable electronic device in space, and processing circuitry connected to the fingerprint sensor, the transmitter and the at least one motion sensor, wherein the method comprises acquiring the fingerprint data from the fingerprint sensor, authenticating the user of the portable electronic device based on the fingerprint data and an enrolled fingerprint of the finger of the user, acquiring sensed data from the at least one motion sensor, identifying a gesture made by the user moving the electronic portable device based on the sensed data from the at least one motion sensor, the gesture representing a functional command, and transmitting, using the transmitter, the functional command together with an identity of the authenticated user to the remotely positioned electronic arrangement, wherein the user is authenticated in parallel with identifying the gesture. This aspect of the invention provides similar advantages as discussed above in relation to the previous aspect of the invention.

According to a further aspect of the present invention, there is provided a computer program product comprising a computer readable medium having stored thereon computer program means for controlling an electronic device, the electronic device comprising a fingerprint sensor providing fingerprint data representing a finger of a user arranged at the fingerprint sensor, a transmitter configured to allow wireless communication with a remotely positioned electronic arrangement, at least one motion sensor providing sensed data based on movement of the portable electronic device in space, and processing circuitry connected to the fingerprint sensor, the transmitter and the at least one motion sensor, wherein the computer program product comprises code for acquiring the fingerprint data from the fingerprint sensor, code for authenticating the user of the portable electronic device based on the fingerprint data and an enrolled fingerprint of the finger of the user, code for acquiring sensed data from the at least one motion sensor, code for identifying a gesture made by the user moving the electronic portable device based on the sensed data from the at least one motion sensor, the gesture representing a functional command, and code for transmitting, using the transmitter, the functional command together with an identity of the authenticated user to the remotely positioned electronic arrangement, wherein the user is authenticated in parallel with identifying the gesture. Also this aspect of the invention provides similar advantages as discussed above in relation to the previous aspects of the invention.

In summary, the present invention generally relates to a portable electronic device and corresponding method allowing control of a remotely positioned electronic arrangement, allowing for improved user convenience and security improvements when combining gesture identification with fingerprint authentication. The present invention provides a solution that simplifies this control/interaction even further, by identifying gestures made by the user when moving the portable electronic device, where the gesture in itself serves as a functional command used in the control/interaction with the remotely positioned electronic arrangement.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which:

FIG. 5 shows a second embodiment of use of the portable electronic device.

DETAILED DESCRIPTION

Figure 1:
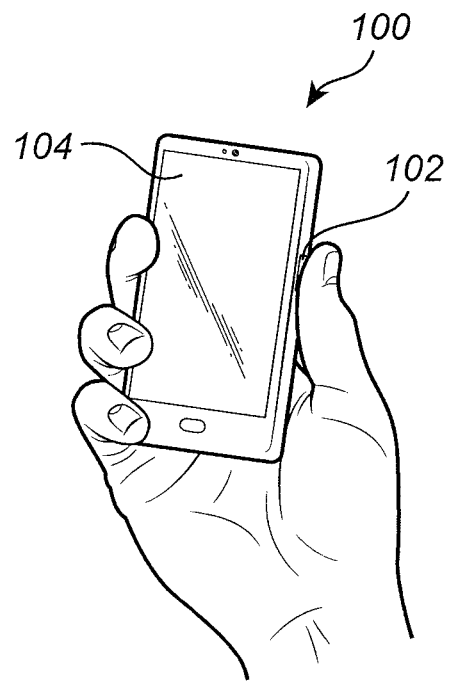
FIG. 1 schematically exemplify a portable electronic device according to the present invention, in the form of a mobile phone.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated the portable electronic device according to the present invention, in the form of a mobile phone 100 with an integrated fingerprint sensor 102 and a display unit 104 with a touch screen interface. In this embodiment the fingerprint sensor 102 is arranged on a side/edge of the mobile phone 100 and the display unit 104 is arranged at the front of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the back or the front side of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
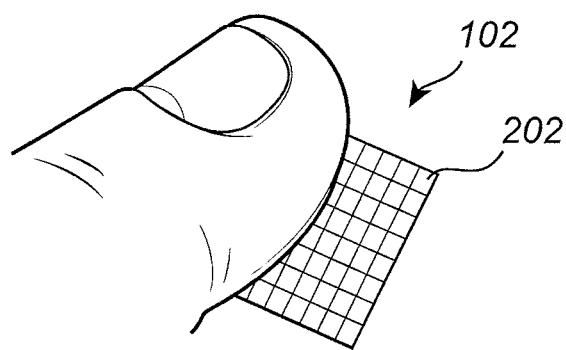
FIG. 2 schematically shows the fingerprint sensor array comprised in the portable electronic device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 202.

Figure 3:
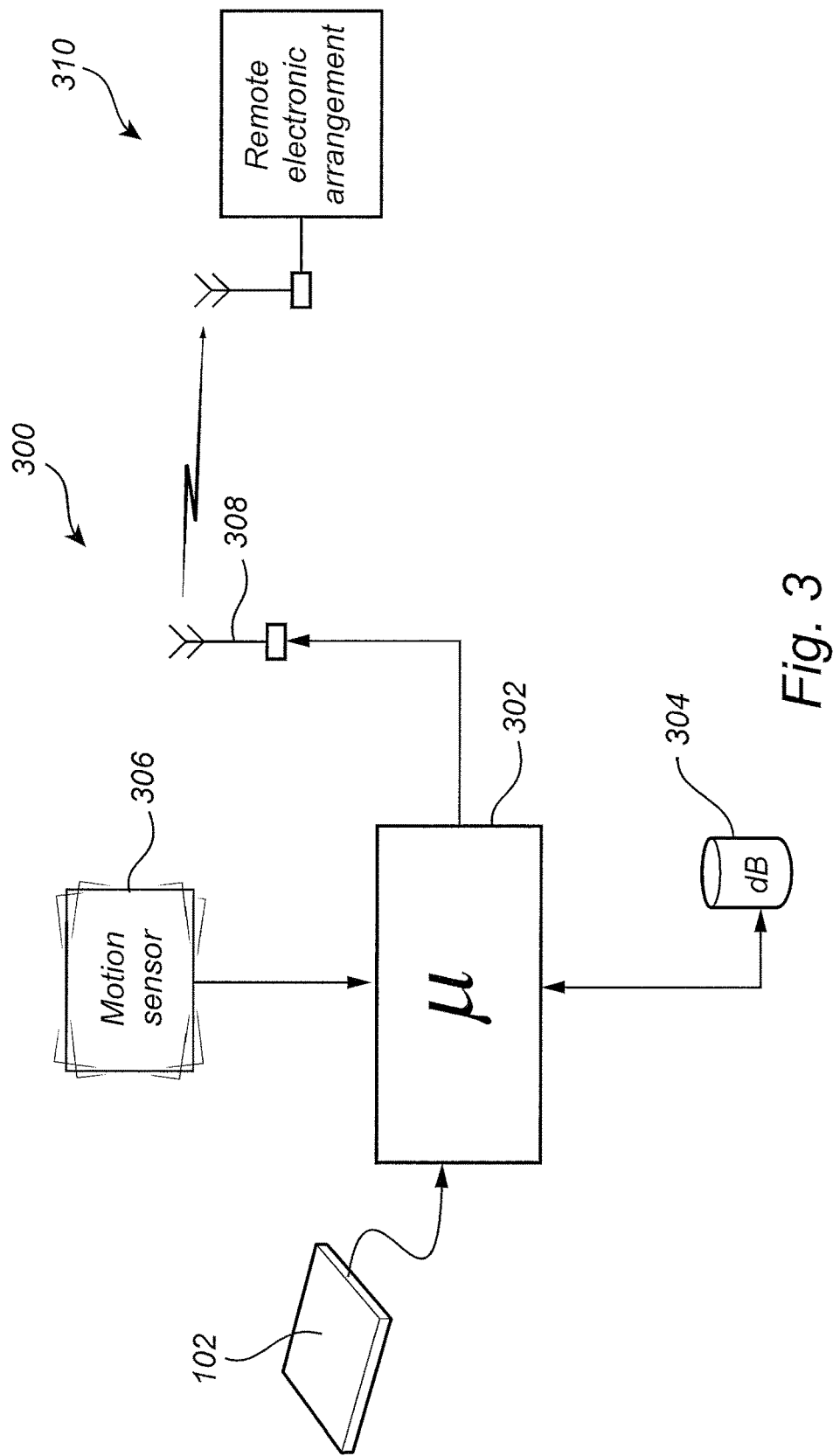
FIG. 3 conceptually illustrates control circuitry configured to implement the methodology according to a currently preferred embodiment of the invention.

With further reference to FIG. 3 there is conceptually illustrated a possible implementation of control circuitry 300 configured to implement the methodology according to a currently preferred embodiment of the invention, for example integrated with the mobile phone 100 shown in FIG. 1. The fingerprint sensor 102 is arranged in electrical communication with a processing circuitry 302 adapted for controlling the fingerprint sensor 102. The control circuitry 300 further comprises a memory, such as a database 304, e.g. storing a fingerprint template for the user. The processing circuitry 302 may each include a microprocessor, microcontroller, programmable digital signal processor or another programmable device. The processing circuitry 302 may also, or instead, each include an application specific integrated circuit, a programmable gate array or programmable array logic, a programmable logic device, or a digital signal processor. Where the processing circuitry 302 includes a programmable device such as the microprocessor, microcontroller or programmable digital signal processor mentioned above, the processor may further include computer executable code that controls operation of the programmable device. It should be understood that all or some parts of the functionality provided by means of the processing circuitry 302 (or generally discussed as "processing circuitry") may be at least partly integrated with the fingerprint sensor 102.

The control circuitry 300 further comprises at least one or more preferably a plurality of motion sensors 306, preferably including one or more rotational motion sensors (gyroscopes) and one or more linear motion sensors (accelerometers). For example, in some embodiments, inertial sensors are used, where the rotational motion sensors are gyroscopes and the linear motion sensors are accelerometers. Gyroscopes can measure the angular velocity of e.g. the mobile phone 100 housing the gyroscope. From one to three gyroscopes can typically be provided, depending on the motion that is desired to be sensed in a particular embodiment. Some implementations may employ more than three gyroscopes, for example to enhance accuracy, increase performance, or improve reliability. Some gyroscopes may be dynamically activated or deactivated, for example to control power usage or adapt to motion processing needs. Accelerometers can measure the linear acceleration of the mobile phone 100 housing the accelerometers. From one to three accelerometers can typically be provided, depending on the motion that is desired to be sensed in a particular embodiment. Some implementations may employ more than three accelerometers, for example to enhance accuracy, increase performance, or improve reliability. Some accelerometers may be dynamically activated or deactivated, for example to control power usage or adapt to motion processing needs. For example, if three gyroscopes and three accelerometers are used, then a 6-axis sensing device is provided providing sensing in all six degrees of freedom. In embodiments with more than three gyroscopes and/or more than three accelerometers, additional degrees of freedom (or sensing axes) can be provided, and/or additional sensor input can be provided for each of the six axis of motion. In some embodiments, a single chip six-axis inertial measurement unit is used. In some embodiments, additional or alternate types of rotational rate sensors and/or linear acceleration sensors can be used.

Once the mobile phone 100 is moved (e.g. include pitch, roll, and yaw) by the user the at least one motion sensor 306 generates motion sensor data that is collected/acquired by the processing circuitry 302. The processing circuitry 302 is preferably configured to implement motion gesture recognition using one or more heuristics and/or algorithms that interpret the sensor motion data to determine which gesture(s) have been input. For example, the processing circuitry 302 can pre-process raw sensor data from the at least one motion sensor 306 by changing coordinate systems or converting to other physical parameters, such that resulting "augmented data" looks similar for all users regardless of the small, unintentional differences in user motion. This augmented data can then be used to train learning systems or hard-code pattern recognizers resulting in much more robust gesture recognition.

The control circuitry 300 further additionally comprises a transmitter/transceiver 308 arranged to allow wireless communication with a remotely positioned electronic arrangement 310. It should be understood that the remotely positioned electronic arrangement 310 is not a component of the control circuitry 300/portable electronic device 100.

The wireless communication between the control circuitry 300/portable electronic device 100 remotely positioned electronic arrangement 310 may for example be arranged in accordance to any type of Wi-Fi standard, Bluetooth, ZigBee, etc., or by using a cellular network communication protocol.

Figure 4A:
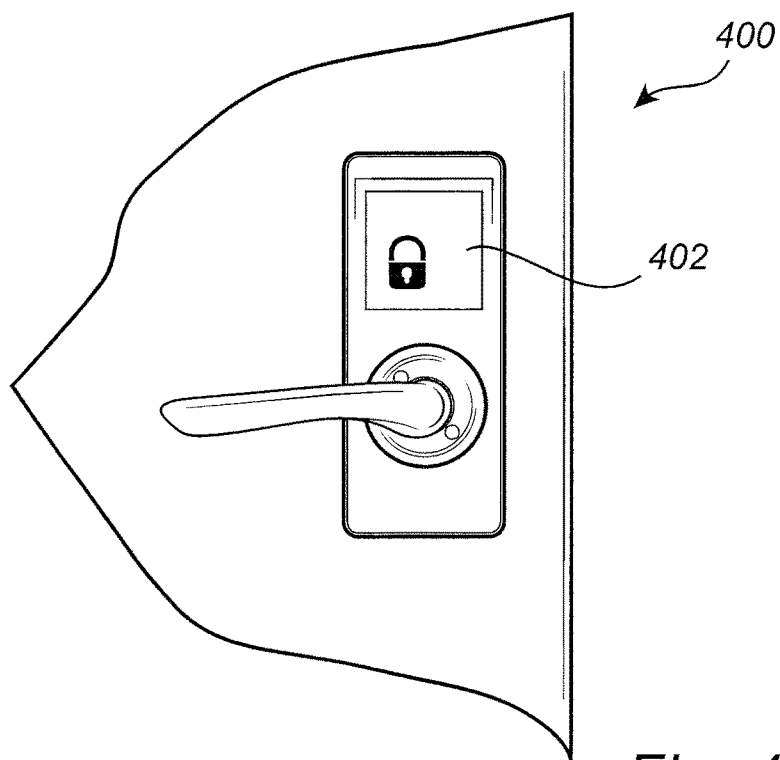
FIGS. 4a and 4b show a first embodiment of use of the portable electronic device for controlling a remotely positioned electronic arrangement.
Figure 4B:
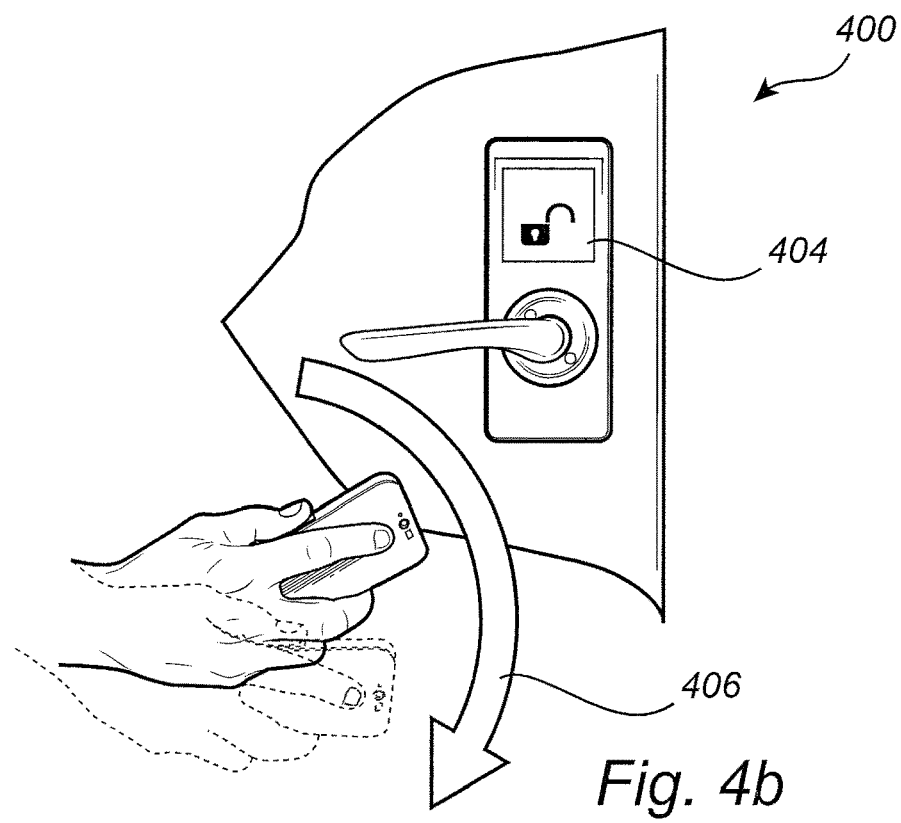
Figure 6:
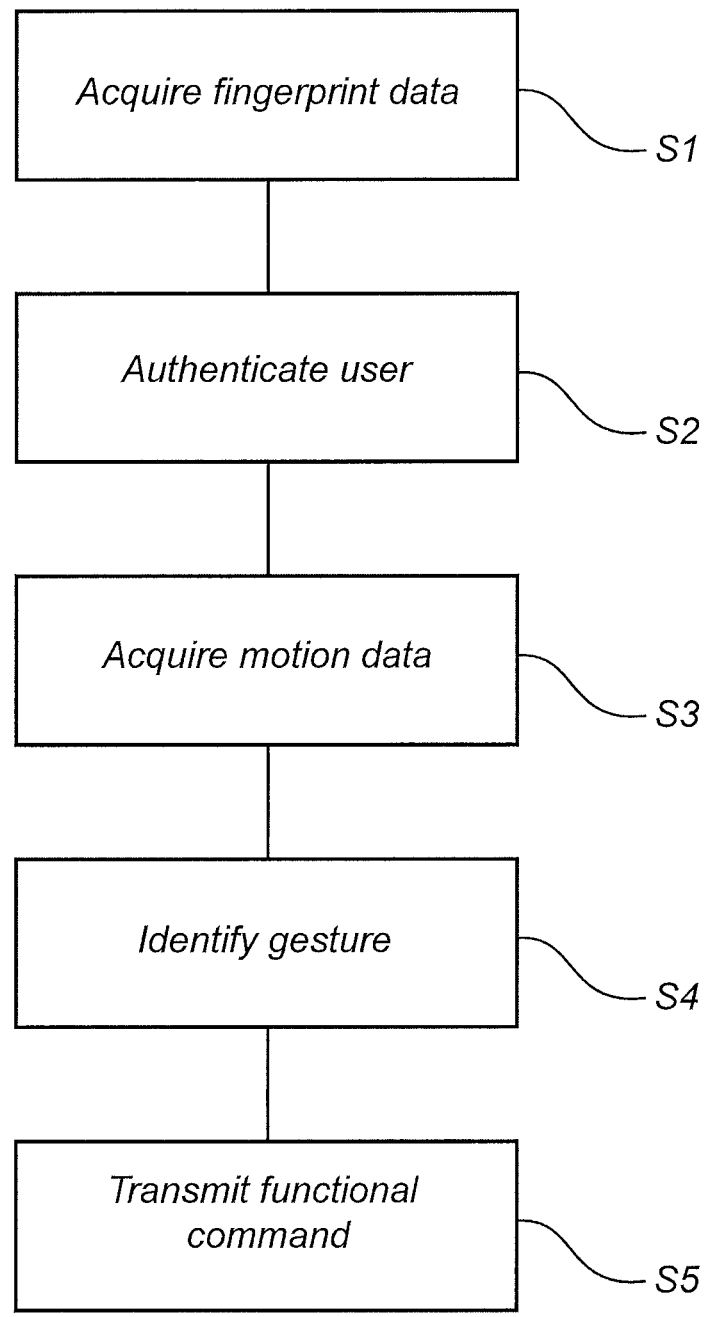
FIG. 6 is a flowchart disclosing the exemplary steps of the invention typically performed in conjunction with the control circuitry of FIG. 3.

Turning now to FIGS. 4a-4b in conjunction with FIG. 6, illustrating a first embodiment of use of the portable electronic device 100 for controlling the remotely positioned electronic arrangement 310. In the illustrated example the remotely positioned electronic arrangement 310 is configured to control a door lock 400 between a closed 402 and an open state 404. The process start with the door being in the locked state and the user holding the mobile phone 100 in his hand being within a visible distance from the door, such as for example on his way up the stairs towards a door or in a hotel corridor. The user places his finger at the side/edge mounted fingerprint sensor 102 of the mobile phone 100. The processing circuit 302 is then following a detection of the finger at the fingerprint sensor 102 arranged to acquire, S1, fingerprint data from the fingerprint sensor 102. The fingerprint data is provided as an input to authenticate, S2, the user by comparing/matching e.g. specific features from the fingerprint data with an enrolled fingerprint (such as a template) for the finger of the user, where data relating to the enrolled finger for example is stored at the database 304. Different types of fingerprint authentication processes are possible and within the scope of the invention for authenticating the user.

In parallel with, or simultaneously, with placing his finger at the fingerprint sensor 102 the user twists/rotates the mobile phone 100 in an unlocking gesture, e.g. corresponding to the gesture normally performed when twisting a door knob. The at least one motion sensor 306 will accordingly generate motion data that is acquired, S3, by the processing circuitry 302. The acquired motion sensor data will in a corresponding manner, and as discussed above, be used as an input in a motion gesture recognition process where the gesture is identified, S4. The database 304 may typically store data relating to a plurality of previously enrolled gestures by the user. The database 304 will also store a functional command corresponding to the identified gesture(s).

In the present example the gesture has been identified as a twisting action and the corresponding functional command is a command to change the state of the door lock 400. Accordingly, the processing circuitry 302 forms e.g. a "functional command package", comprising at least the functional command and the identity of the user. The functional command package is subsequently transmitted, S5, to the remotely arranged electronic arrangement 310 controlling the door lock 400. Once received by the electronic arrangement 310, the electronic arrangement 310 may compare the identity of the user with e.g. a plurality of authorized users and decide if the functional command is to be executed/performed. In the present example the user is an authorized user and the functional command to unlock 404 the door is performed.

As understood from the above, if for example walking along a hotel corridor, the user may typically only be authorized to unlock one single door. The user may thus at any time perform the twisting action and only the "correct" door will be unlocked.

Turning finally to FIG. 5 showing a second example of using the inventive methodology, specifically in relation to communication between a first 502 and a second 504 user facing each other, each holding a mobile phone 100 with the inventive functionality of parallel user authentication and gesture identification. Specifically, the first user 502 wants to send a data file 506 to the second user 504. The data file 506 may for example be an image file, an electronic business card, etc. Any type of data is possible and within the scope of the invention, i.e. not necessarily being a data file. In a similar manner as discussed above, the first user 502 moves his mobile phone 100 is a "waving" gesture while his finger is in contact with the fingerprint sensor 102. In this example, the functional command will be the transmission of the data file 506 to the second user 502, where the data file 506 is transmitted together with the identity of the first user 502.

In this specific example, the second user 504 "must" in a similar manner perform a waving gesture/touch the fingerprint sensor 102 to receive the data file 506. Once the data file 506 has been received at the mobile phone 100 of the second user 504, a receipt may possibly be transmitted from the mobile phone 100 of the second user 504 to the mobile phone 100 of the first user 502, where the receipt should be seen as the functional command. The receipt is preferably transmitted together with the identity of the second user 504, allowing the first user 502 to log the process of sending the data file 506 to the second user 504, including that the data file 506 in fact was received by the second user 504.

To further improve the security of transmission of the functional command, it may in accordance to the invention be possible to also implementation some form of location based services (LBS). In the embodiment shown in FIG. 5 this is provided by the inclusion of a plurality of location beacons 508, 510, 512. The beacons 508, 510, 512 may for example be Bluetooth low energy (BLE) beacons, in wireless communication with the mobile phone 100 of the first user 502 and/or the mobile phone 100 of the second user 504. The beacons 508, 510, 512 will make it possible for e.g. the mobile phone 100 of the first user 502 to determine that the mobile phone 100 of the second user 504 in fact is in front of him, i.e. not behind him. The mobile phone 100 of the first user 502 may accordingly be configured to only transmit the functional command in a specified direction, in the illustrated example only in the direction from the first user 502 to the second user 504. Accordingly, even if a person standing behind the first user 502 is performing the "correct" waiving gesture he will not be allowed to receive the data file 506. It should be understood that it may not be necessary to pre-identify the recipient of the data file 506, but that the data file 506 is only to be received by a further (e.g. the second) user performing the correct gesture.

The LBS functionality as discussed above may of course also be implemented in relation to e.g. the door unlocking functionality discussed in relation to FIGS. 4*a* and 4*b*, e.g. if walking along a corridor only doors towards the present walking direction will be able to be unlocked by the user.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A portable electronic device, comprising:
a fingerprint sensor providing fingerprint data representing a finger of a user arranged at the fingerprint sensor;
a transmitter configured to allow wireless communication with a remotely positioned electronic arrangement;
at least one motion sensor providing sensed data based on movement of the portable electronic device in space, and
processing circuitry connected to the fingerprint sensor, the transmitter and the at least one motion sensor, wherein the processing circuitry is configured to:
acquire the fingerprint data from the fingerprint sensor;
authenticate the user of the portable electronic device based on the fingerprint data and an enrolled fingerprint of the finger of the user;
acquire sensed data from the at least one motion sensor;
identify a gesture made by the user moving the electronic portable device based on the sensed data from the at least one motion sensor, the gesture representing a functional command, and
transmit, using the transmitter, the functional command together with an identity of the authenticated user to the remotely positioned electronic arrangement,
wherein the user is authenticated in parallel with identifying the gesture,
wherein the functional command is transmitted to the remotely positioned electronic arrangement only if the user's finger is arranged at the fingerprint sensor for a complete duration of acquiring sensed data from the at least one motion sensor and identifying the gesture made by the user moving the electronic portable device, and
wherein the portable electronic device is configured to determine a spatial relation between the portable electronic device and the remotely positioned electronic arrangement in order to transmit the functional command only in a specified direction toward the remotely positioned electronic arrangement.

2. The portable electronic device according to claim 1, wherein the user is authenticated simultaneously of when the gesture is identified.

3. The portable electronic device according to claim 1, wherein the fingerprint sensor is a fingerprint touch sensor.

4. The portable electronic device according to claim 1, wherein the fingerprint data acquired simultaneously with acquiring sensed data from the at least one motion sensor.

5. The portable electronic device according to claim 1, wherein the at least one motion sensor comprises an accelerometer.

6. The portable electronic device according to claim 1, wherein the identity of the authenticated user is tagged with the functional command.

7. The portable electronic device according to claim 1, wherein functional command comprises at least one of unlocking a door controlled by the remotely positioned electronic arrangement and transmitting a file to the remotely positioned electronic arrangement.

8. The portable electronic device according to claim 1, wherein the remotely positioned electronic arrangement is arranged less than 100 m from the portable electronic device.

9. The portable electronic device according to claim 1, wherein the portable electronic device is a mobile phone.

10. A remotely positioned electronic arrangement, wherein the remotely positioned electronic arrangement is a further electronic device configured in accordance to claim 1.

11. The portable electronic device according to claim 1, wherein the processing circuitry is further configured to:
store data relating to a plurality of previously enrolled gestures performed by the user, and
match the sensed data from the at least one motion sensor with the plurality of previously enrolled gestures to identify a current gesture made by the user moving the electronic portable device.

12. The portable electronic device according to claim 11, wherein the plurality of previously enrolled gestures comprises at least twisting the portable electronic device and rotating the portable electronic device.

13. An electronic control system, comprising:
an electronic device configured in accordance to claim 1, and
a remotely positioned electronic arrangement.

14. The electronic control system according to claim 13, further comprising at least one beacon for allowing determination of a spatial relation between the portable electronic device and the remotely positioned electronic arrangement.

15. A method to control a remotely positioned electronic arrangement using a portable electronic device, the portable electronic device comprising:
a fingerprint sensor providing fingerprint data representing a finger of a user arranged at the fingerprint sensor;
a transmitter configured to allow wireless communication with a remotely positioned electronic arrangement;
at least one motion sensor providing sensed data based on movement of the portable electronic device in space, and
processing circuitry connected to the fingerprint sensor, the transmitter and the at least one motion sensor,
wherein the method comprises:
acquiring the fingerprint data from the fingerprint sensor;
authenticating the user of the portable electronic device based on the fingerprint data and an enrolled fingerprint of the finger of the user;
acquiring sensed data from the at least one motion sensor;
identifying a gesture made by the user moving the electronic portable device based on the sensed data from the at least one motion sensor, the gesture representing a functional command, and
transmitting, using the transmitter, the functional command together with an identity of the authenticated user to the remotely positioned electronic arrangement,
wherein the user is authenticated in parallel with identifying the gesture,
wherein the functional command is transmitted to the remotely positioned electronic arrangement only if the user's finger is arranged at the fingerprint sensor for a complete duration of acquiring sensed data from the at least one motion sensor and identifying the gesture made by the user moving the electronic portable device, and
wherein the portable electronic device is configured to determine a spatial relation between the portable electronic device and the remotely positioned electronic arrangement in order to transmit the functional command only in a specified direction toward the remotely positioned electronic arrangement.

16. A computer program product comprising a non-transitory computer readable medium having stored thereon computer program means for controlling a portable electronic device, the electronic device comprising:
- a fingerprint sensor providing fingerprint data representing a finger of a user arranged at the fingerprint sensor;
- a transmitter configured to allow wireless communication with a remotely positioned electronic arrangement;
- at least one motion sensor providing sensed data based on movement of the portable electronic device in space, and
- processing circuitry connected to the fingerprint sensor, the transmitter and the at least one motion sensor,
- wherein the computer program product comprises:
  - code for acquiring the fingerprint data from the fingerprint sensor;
  - code for authenticating the user of the portable electronic device based on the fingerprint data and an enrolled fingerprint of the finger of the user;
  - code for acquiring sensed data from the at least one motion sensor;
  - code for identifying a gesture made by the user moving the electronic portable device based on the sensed data from the at least one motion sensor, the gesture representing a functional command, and
  - code for transmitting, using the transmitter, the functional command together with an identity of the authenticated user to the remotely positioned electronic arrangement,
- wherein the user is authenticated in parallel with identifying the gesture,
- wherein the functional command is transmitted to the remotely positioned electronic arrangement only if the user's finger is arranged at the fingerprint sensor for a complete duration of acquiring sensed data from the at least one motion sensor and identifying the gesture made by the user moving the electronic portable device, and
- wherein the portable electronic device is configured to determine a spatial relation between the portable electronic device and the remotely positioned electronic arrangement in order to transmit the functional command only in a specified direction toward the remotely positioned electronic arrangement.

\* \* \* \* \*